US009562196B2

(12) United States Patent
Kresnyak et al.

(10) Patent No.: US 9,562,196 B2
(45) Date of Patent: Feb. 7, 2017

(54) ENHANCEMENT OF FISCHER-TROPSCH PROCESS FOR HYDROCARBON FUEL FORMULATION

(71) Applicant: Expander Energy Inc., Calgary (CA)

(72) Inventors: Steve Kresnyak, Calgary (CA); Timothy William Giles, Markham (CA)

(73) Assignee: Expander Energy, Inc., Calgary (CA)

(*) Notice: Subject to any disclaimer, the term of this patent is extended or adjusted under 35 U.S.C. 154(b) by 0 days.

(21) Appl. No.: 14/799,901

(22) Filed: Jul. 15, 2015

(65) Prior Publication Data

US 2015/0315481 A1 Nov. 5, 2015

Related U.S. Application Data

(63) Continuation of application No. 13/024,925, filed on Feb. 10, 2011, now Pat. No. 9,115,324.

(51) Int. Cl.
*B01J 19/00* (2006.01)
*B01J 19/24* (2006.01)
(Continued)

(52) U.S. Cl.
CPC . *C10G 2/32* (2013.01); *C01B 3/38* (2013.01); *C10G 2/30* (2013.01); *C10G 2/34* (2013.01);
(Continued)

(58) Field of Classification Search
CPC .......... Y02E 50/00; Y02E 50/30; Y02E 50/32; Y02P 30/00; Y02P 30/20; Y02T 50/00; Y02T 50/60; Y02T 50/67; Y02T 50/678; B01J 19/00; B01J 19/24; C01B 3/00; C01B 3/02; C01B 3/32; C01B 3/34; C01B 3/38; C01B 2203/00–2203/1211; C01B 2203/1235; C10G 2/00; C10G 2/30; C10G 2/32; C10G 2/34; C10G 2300/00; C10G 2300/10; C10G 2300/1003; C10G 2300/1011; C10G 2300/40; C10G 2300/4081; C10J 2400/00; C10J 2400/02; C10J 2400/26; C10J 3/00; C10J 3/02; C10J 3/20; C10J 3/72; C10J 3/82; C10J 2300/00; C10J 2300/16; C10J 2300/1603; C10J 2300/1618; C10J 2300/164; C10J 2300/1656; C10J 2300/1659; C10J 2300/18; C10J 2300/1846; C10K 3/00; C10K 3/06; C10L 1/00; C10L 1/04; C10L 1/08; C10L 2200/00; C10L 2200/04; C10L 2200/0461; C10L 2200/0469; C10L 2200/0492; C10L 2270/00; C10L 2270/02; C10L 2270/026; C10L 2270/04; C10L 2290/00; C10L 2290/04024; C10L 2290/42
See application file for complete search history.

(56) References Cited

U.S. PATENT DOCUMENTS 6,958,363 B2 * 10/2005 Espinoza ............... C01B 3/382
208/106
2010/0158793 A1 * 6/2010 Bouillon ............ B01D 53/1475
423/650

* cited by examiner

*Primary Examiner* — Natasha Young
(74) *Attorney, Agent, or Firm* — MBM Intellectual Property Law LLP

(57) ABSTRACT

An enhanced Fischer-Tropsch process for the synthesis of sulfur free, clean burning, green hydrocarbon fuels, examples of which include syndiesel and aviation fuel. Naphtha is destroyed in a hydrogen generator and recycled as feedstock to a syngas (FT) reactor in order to enhance the production of syndiesel from the reactor. A further variation integrates a second hydrogen generator capturing light hydrocarbon gas for conversion to hydrogen and carbon monoxide which supplements the Fischer-Tropsch reactor. The result is a considerable increase in the volume of (Continued)

syndiesel formulated. A system for effecting the process is also characterized in the specification.

11 Claims, 6 Drawing Sheets

(51) Int. Cl.

| | |
|---|---|
| *C01B 3/00* | (2006.01) |
| *C01B 3/02* | (2006.01) |
| *C01B 3/32* | (2006.01) |
| *C01B 3/34* | (2006.01) |
| *C01B 3/38* | (2006.01) |
| *C10G 2/00* | (2006.01) |
| *C10K 3/00* | (2006.01) |
| *C10K 3/06* | (2006.01) |
| *C10L 1/00* | (2006.01) |
| *C10L 1/04* | (2006.01) |
| *C10J 3/02* | (2006.01) |
| *C10J 3/20* | (2006.01) |
| *C10J 3/82* | (2006.01) |
| *C10L 1/08* | (2006.01) |
| *C10J 3/00* | (2006.01) |
| *C10J 3/72* | (2006.01) |

(52) U.S. Cl.
CPC .. *C10J 3/02* (2013.01); *C10J 3/20* (2013.01); *C10J 3/82* (2013.01); *C10K 3/06* (2013.01); *C10L 1/04* (2013.01); *C10L 1/08* (2013.01); C01B 2203/0233 (2013.01); C01B 2203/062 (2013.01); C01B 2203/1052 (2013.01); C01B 2203/1064 (2013.01); C01B 2203/1082 (2013.01); C01B 2203/1235 (2013.01); C10G 2300/1003 (2013.01); C10G 2300/1011 (2013.01); C10G 2300/4081 (2013.01); C10G 2400/02 (2013.01); C10G 2400/26 (2013.01); C10J 2300/1618 (2013.01); C10J 2300/1659 (2013.01); C10J 2300/1846 (2013.01); C10L 2200/0492 (2013.01); C10L 2270/026 (2013.01); C10L 2270/04 (2013.01); C10L 2290/04 (2013.01); C10L 2290/24 (2013.01); C10L 2290/42 (2013.01); Y02E 50/32 (2013.01); Y02P 30/20 (2015.11); Y02T 50/678 (2013.01)

ENHANCEMENT OF FISCHER-TROPSCH PROCESS FOR HYDROCARBON FUEL FORMULATION

This application is a continuation under 35 U.S.C. §120 of U.S. patent application Ser. No. 13/024,925, now U.S. Pat. No. 9,115,324, filed Feb. 10, 2011, the entire disclosures of which are hereby incorporated by reference herein.

TECHNICAL FIELD

The present invention relates to the modification of the Fischer-Tropsch sequence of operations including the Fischer-Tropsch process for the production of hydrocarbon fuels in an efficient manner.

BACKGROUND OF THE INVENTION

In the prior art, the Fischer-Tropsch process has been used for decades to assist in the formulation of hydrocarbons. In the last several years, this has become a concern giving the escalating environmental concerns regarding pollution together with the increasing costs of hydrocarbon exploration and refining. The major producers in this area have expanded the art significantly in this technological area with a number of patented advances and pending applications in the form of publications.

In the art, advances made in terms of the raw materials that have been progenitor materials for the Fischer-Tropsch process, have included, for example, coal-to-liquid (CTL), bio-to-liquid (BTL) and gas-to-liquid (GTL). One of the more particularly advantageous features of the bio or biomass to liquid technology is the fact that it presents a possibility to not only formulate a less carbon intensive product, but also make use of waste biomass materials, such as forestry by products, construction and other wood waste products, human waste products, or agriculture feedstocks, byproducts and waste products. As is generally known, the Fischer-Tropsch process converts hydrogen and carbon monoxide (commonly known as syngas) into liquid hydrocarbon fuels, examples of which include synthetic diesel, naphtha, kerosene, aviation or jet fuel and paraffinic wax. As a precursory step, the coal, gas or biomass, etc. is thermally gasified using heat and pressure to produce the syngas which results in turning the feedstock into hydrogen and carbon monoxide. As a result of the Fischer-Tropsch technique, the synthetic fuels are very appealing from an environmental point of view, since they are paraffinic in nature and substantially devoid of contamination. This is particularly true in the case of the diesel fuel synthesis where the synthetic product has ideal properties for diesel engines, including extremely high cetane rating >70, negligible aromatics and sulphur content, in addition to enabling optimum combustion and virtually emission free operation. Synthetic diesel fuels significantly reduce nitrous oxide and particulate matter when compared with petroleum based diesel fuel.

One example of recent advances that have been made in this area of technology includes the features taught in U.S. Pat. No. 6,958,363, issued to Espinoza, et al., Oct. 25, 2005. In the document, Espinoza et al. provide for hydrogen use in a GTL plant.

In essence, the patent teaches a process for synthesizing hydrocarbons where initially, a synthesis gas stream is formulated in a syngas generator. The synthesis gas stream comprises primarily hydrogen and carbon monoxide. The process involves catalytically converting the synthesis gas stream in a synthesis reaction to produce hydrocarbons and water followed by the generation of hydrogen-rich stream in the hydrogen generator. The process indicates that the hydrogen generator is separate from the syngas generator (supra) and that the syngas generator comprises either a process for converting hydrocarbons to olefins, a process for catalytically dehydrogenating hydrocarbons, or a process for refining petroleum, and a process for converting hydrocarbons to carbon filaments. The final step in the process in its broadest sense, involves consumption of hydrogen from the hydrogen-rich stream produced in one or more processes that result and increase value of the hydrocarbons or the productivity of the conversion of the hydrocarbons from the earlier second mentioned step.

Although a useful process, it is evident from the disclosure of Espinoza et al. that there is a clear intent to create olefins such as ethylene and propylene for petrochemical use, and aromatics for gasoline production. Additionally, there is a reforming step indicated to include the reformation of naphtha feedstock to generate a net surplus hydrogen byproduct which is then recombined into the process. The naphtha is subsequently converted to aromatics for high octane gasoline blend stock. There is no specific contemplation and therefore no discussion of effectively destroying the naphtha for purposes of enhancing the Fischer-Tropsch process which, in turn, results in the significant augmentation of hydrocarbon synthesis.

The Espinoza et al. process is an excellent gas to a liquid process link to gasoline production from natural gas using naphtha reformation to make the gasoline product. In the disclosure, it was discovered that the excess hydrogen could be used to enhance the productivity of conversion.

A further significant advancement in this area of technology is taught by Bayle et al., in U.S. Pat. No. 7,214,720, issued May 8, 2007. The reference is directed to the production of liquid fuels by a concatenation of processes for treatment of a hydrocarbon feedstock.

It is indicated in the disclosure that the liquid fuels begin with the organic material, typically biomass as a solid feedstock. The process involves a stage for the gasification of the solid feedstock, a stage for purification of synthesis gas and subsequently a stage for transformation of the synthesis gas into a liquid fuel.

The patentees indicate in column 2 the essence of the technology:

"A process was found for the production of liquid fuels starting from a solid feedstock that contains the organic material in which:
a) The solid feedstock is subjected to a gasification stage so as to convert said feedstock into synthesis gas comprising carbon monoxide and hydrogen,
b) the synthesis gas that is obtained in stage a) is subjected to a purification treatment that comprises an adjustment for increasing the molar ratio of hydrogen to carbon monoxide, H2/CO, up to a predetermined value, preferably between 1.8 and 2.2,
c) the purified synthesis gas that is obtained in stage b) is subjected to a conversion stage that comprises the implementation of a Fischer-Tropsch-type synthesis so as to convert said synthesis gas into a liquid effluent and a gaseous effluent,
d) the liquid effluent that is obtained in stage c) is fractionated so as to obtain at least two fractions that are selected from the group that consists of: a gaseous fraction, a naphtha fraction, a kerosene fraction, and a gas oil fraction, and
e) at least a portion of the naphtha fraction is recycled in gasification stage."

Although a meritorious procedure, the overall process does not result in increased production of hydrocarbons. The naphtha recycle stream that is generated in this process is introduced into the gasification stage. This does not directly augment the syngas volume to the Fischer-Tropsch reactor which results in increased volumes of hydrocarbons being produced giving the fact that the feedstock is required for the process. To introduce the naphtha to the gasification stage as taught in Bayle et al., is to modify the $H_2/CO$ ratio in the gasification stage using an oxidizing agent such as water vapour and gaseous hydrocarbon feedstocks such as natural gas with the recycled naphtha, while maximizing the mass rate of carbon monoxide and maintain sufficient temperature above 1000° C. to 1500° C. in the gasification stage to maximize the conversion of tars and light hydrocarbons.

In U.S. Pat. No. 6,696,501, issued Feb. 24, 2004, to Schanke et al., there is disclosed an optimum integration process for Fischer-Tropsch synthesis and syngas production.

Among their features, the process instructs the conversion of natural gas or other fossil fuels to higher hydrocarbons where the natural gas or the fossil fuels is reacted with steam and oxygenic gas in a reforming zone to produce synthesis gas which primarily contains hydrogen, carbon monoxide and carbon dioxide. The synthesis gas is then passed into a Fischer-Tropsch reactor to produce a crude synthesis containing lower hydrocarbons, water and non-converted synthesis gas. Subsequently, the crude synthesis stream is separated in a recovery zone into a crude product stream containing heavier hydrocarbons, a water stream and a tail gas stream containing the remaining constituents. It is also taught that the tail gas stream is reformed in a separate steam reformer with steam and natural gas and then the sole reformed tail gas is introduced into the gas stream before being fed into the Fischer-Tropsch reactor.

In the reference, a high carbon dioxide stream is recycled back to an ATR in order to maximize the efficiency of the carbon in the process. It is further taught that the primary purpose of reforming and recycling the tail gas is to steam reform the lower hydrocarbons to carbon monoxide and hydrogen and as there is little in the way of light hydrocarbons, adding natural gas will therefore increase the carbon efficiency. There is no disclosure regarding the destruction of naphtha in an SMR or ATR to generate an excess volume of syngas with subsequent recycle to maximize hydrocarbon production. In the Schanke et al. reference, the patentees primarily focused on the production of the high carbon content syngas in a GTL environment using an ATR as crude synthesis stream and reforming the synthesis tail gas in an SMR with natural gas addition to create optimum conditions that feed to the Fischer-Tropsch reactor.

As with the previous art that has been discussed above, this reference employs, as a cornerstone technology, catalytic gasification.

In respect of other progress that has been made in this field of technology, the art is replete with significant advances in, not only gasification of solid carbon feeds, but also methodology for the preparation of syngas, management of hydrogen and carbon monoxide in a GTL plant, the Fischer-Tropsch reactors management of hydrogen, and the conversion of biomass feedstock into hydrocarbon liquid transportation fuels, inter alia. The following is a representative list of other such references. This includes: U.S. Pat. Nos. 7,776,114; 6,765,025; 6,512,018; 6,147,126; 6,133,328; 7,855,235; 7,846,979; 6,147,126; 7,004,985; 6,048,449; 7,208,530; 6,730,285; 6,872,753, as well as United States Patent Application Publication Nos. US2010/0113624; US2004/0181313; US2010/0036181; US2010/0216898; US2008/0021122; US 2008/0115415; and US 2010/0000153.

Copious features flow from practicing the technology of this application, exemplary of which are:
high quality diesel product or additive;
ii. high quality diesel and jet fuel with an absence of sulfur;
iii. absence of petroleum by-products or low value feedstocks such as naphtha;
iv. low emission and clean burning diesel and jet fuel;
v. increased cetane rating with concomitant augmented performance; and
vi. significant volume output of diesel/jet fuel compared to conventional processes using a Fischer-Tropsch reactor.

SUMMARY OF THE INVENTION

One object of the present invention is to provide an improved Fischer-Tropsch based synthesis process for synthesizing hydrocarbons with a substantially increased yield.

A further object of one embodiment of the present invention is to provide a process for synthesing hydrocarbons, comprising the steps of formulating a hydrogen lean syngas stream in a non-catalytic thermal partial oxidizing gasification reaction (POX); catalytically converting the syngas stream to produce naphtha; recycling produced naphtha as a feedstream to a hydrogen generator to formulate/synthesize a hydrogen rich stream; and combining the hydrogen rich stream with the hydrogen lean syngas stream of step (a) to enhance the conversion of hydrocarbons.

The present technology provides a very elegant solution to ameliorate the shortcomings that have been clearly evinced in the prior art references. Despite the fact that the prior art, in the form of patent publications, issued patents, and other academic publications, all recognize the usefulness of a Fischer-Tropsch process, steam methane reforming, autothermal reforming, biomass gasification, naphtha recycle, and other processes, the prior art when taken individually or when mosaiced is deficient a process that provides the synthesis of a hydrogen rich stream to augment a lean stream for passage into a Fischer-Tropsch or suitable reactor for the purpose of enhancing the production of, as one example, diesel fuel or aviation fuel. As is well known, the Fischer-Tropsch process is particularly useful since the resultant synthetic fuel is "clean" fuel and does not have the contamination level typically associated with the same petroleum based fuel.

The present invention amalgamates, in a previously unrecognized combination, a series of known unit operations into a much improved synthesis route for production of synthetic hydrocarbon fuels. This process engages a counter-intuitive step, namely, the removal of a production fraction, namely the naphtha, which, despite being a refined product, is then effectively destroyed making use of the naphtha as a feedstock for a hydrogen generator and then recycled into the Fischer-Tropsch generator. This keystone unit operation is propitious since it works in concert with all of the other precursor operations which, of their own right, are highly effective, namely the gasification, hydrogen generation, and Fischer-Tropsch synthesis operations.

It has been discovered that by employing the naphtha product fraction as a feedstock to the hydrogen generator, shown in the example and discussed hereinafter in greater detail, as a steam methane reformer (SMR) results in a 40% increase in the volume of diesel, or as it is more effectively referred to in the art, as syndiesel.

In accordance with a further embodiment of the instant methodology, the process may also include an autothermal reforming unit (ATR) operation. As is well known to those skilled in the art, autothermal reforming employs carbon dioxide and oxygen, or steam, in a reaction with light hydrocarbon gases like natural gas to form syngas. This is an exothermic reaction in view of the oxidation procedure. When the autothermal reformer employs carbon dioxide, the hydrogen to carbon monoxide ratio produced is 1:1 and when the autothermal reformer uses steam, the ratio produced is approximately 2.5:1.

The reactions that are incorporated in the autothermal reformer are as follows:

$$2CH_4+O_2+CO_2 \rightarrow 3H_2+3CO+H_2O+HEAT.$$

When steam is employed, the reaction equation is as follows:

$$4CH_4+O_2+2H_2O+HEAT \rightarrow 10H_2+4CO.$$

One of the more significant benefits of using the ATR is realized in the variability of the hydrogen to carbon monoxide ratio. In the instant technology, an ATR may also be considered as a hydrogen generator, as described previously. It has been found that the addition of the ATR operation to the circuit in combination with the hydrogen generation circuit, shown in the example above as a steam methane reformer (SMR), has a significant effect on the hydrocarbon productivity from the overall process.

A major discovery materialized from making use of, for example, light hydrocarbon gas as byproduct from the Fischer-Tropsch reaction and hydrocarbon upgrader processing, commonly known as refinery gas, as a feedstock to the ATR together with the naphtha recycle as feedstock to the SMR, which results in a significant increase in the volume of syndiesel fuel produced. By way of example, by employing the combination of SMR and ATR with naphtha recycle, the process is capable of converting 100% of all the carbon introduced by the biomass feedstock to syndiesel with a 300% increase in production of syndiesel and synthetic jet fuel, as compared to conventional Fischer-Tropsch operation and without the production of any hydrocarbon byproducts. This obviously has significant economic benefits.

Accordingly, a further object of one embodiment of the present invention is to provide a process for synthesing hydrocarbons, comprising the steps of: (a) formulating a hydrogen lean syngas stream in a non-catalytic partial oxidation reformer (POX) reaction; (b) catalytically converting the syngas stream to produce hydrocarbon containing at least naphtha and fuel gas; (c) recycling the naphtha to a hydrogen generator to form a hydrogen rich stream; (d) recycling fuel gas from step (b) to a second syngas generator to form a supplemental syngas stream; and (e) combining the hydrogen rich stream and the supplemental syngas stream with the hydrogen lean stream of step (a) to enhance the conversion of hydrocarbons.

In accordance with a further object of one embodiment of the present invention, a system for synthesizing hydrocarbons, the system comprising: (a) means for generating syngas lean in hydrogen content; (b) means for catalytically converting the syngas to produce hydrocarbon containing at least naphtha; (c) a hydrogen generator; (d) circuit means for recycling naphtha to the hydrogen generator to form a hydrogen rich stream; and (e) circuit means for combining the hydrogen rich stream with the syngas stream lean in hydrogen content to provide a blended and enriched hydrogen content stream for enhancing hydrocarbon production.

Referring now to the drawings as they generally describe the invention, reference will now be made to the accompanying drawings illustrating preferred embodiments.

BRIEF DESCRIPTION OF THE DRAWINGS

Similar numerals employed in the figures denote similar elements.

DETAILED DESCRIPTION OF PREFERRED EMBODIMENTS

Figure 1:
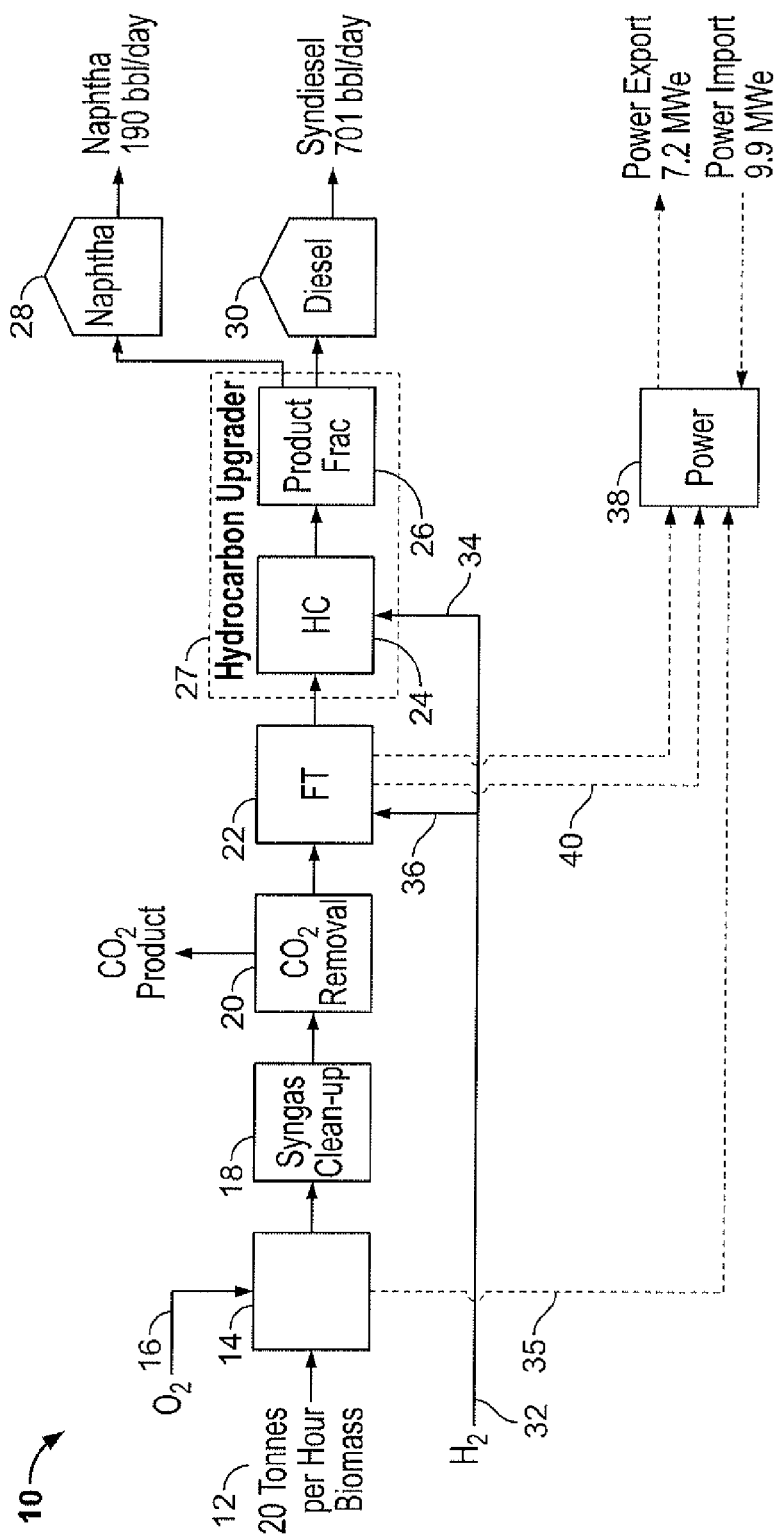
FIG. 1 is a process flow diagram of methodology known in the prior art.

Referring now to FIG. 1, shown is a process flow diagram of a circuit for gasifying biomass with the result being the production of naphtha and syndiesel. The process is generally denoted by numeral 10 and begins with a biomass feedstock 12, which feedstock has been described with examples herein previously. The biomass is then treated in a gasifier 14 to which oxygen 16 may be added as required. The gasifier may be any suitable gasifier, however, as an example, a gasifier that is useful in this process is that which has been patented by Choren Industries GmbH. Details of this gasifier and the process for using the gasifier are disclosed in U.S. Pat. No. 7,776,114, issued Aug. 17, 2010, to Rüger et al. The Choren gasification process and apparatus has been found to be effective in the methodology of the present invention to be discussed hereinafter. Generally, as is known from the Choren process, the same effectively involves a low temperature pyrolysis stage which is followed by a high temperature gasification stage.

Although the Choren gasifier is a highly eligible process and apparatus for carrying out the instant technology, it will be well appreciated by those skilled in the art that any other suitable gasifier can be integrated into the process without any compromise in performance. Table 1 delineates gasifiers useful for syngas production.

TABLE 1

| | Special Gasifiers for Synthesis Gas Production | | | | |
|---|---|---|---|---|---|
| | Carbo V | Entrained flow gasifier | CFB | Blue Tower Gasifier | FICFB |
| Total system | Low temp. gasifier and entrained flow gasifier | Pyrolysis and entrained flow gasifier | Circulation Fluidized Bed gasifier (CFB) | Pyrolysis and reforming | Fast internal gasification |

TABLE 1-continued

Special Gasifiers for Synthesis Gas Production

|  | Carbo V | Entrained flow gasifier | CFB | Blue Tower Gasifier | FICFB |
|---|---|---|---|---|---|
| 1$^{st}$ stage | Low temp. gasifier at 400-600° C. | Flash pyrolysis 500° C. | — | Pyrolysis 550-600° C. | — |
| Gasifier | Autotherm entrained flow gasifier with 2 zones: Combustion 1300-1500° C., Gasification 800-900° C. P$_{atm}$ | Autotherm entrained flow gasifier ~1300° C. and >50 bar | Autotherm CFB with silica sand as bed, >900° C., P$_{atm}$ | Autotherm reforming with ceramic as heat carrier, 950° C., P$_{atm}$ | CFB gasification with 2 zones: Combustion with air 970° C., Gasification 900° C. |
| Gasification Agent | O$_2$/air | O$_2$ | O$_2$/H$_2$O | H$_2$O | H$_2$O |
| Gas cleaning | Bag filter, wet scrubber, SO$_2$-removal | Wet scrubber, cooling SO$_2$-removal | Hot gas filter with ceramic, wet scrubber, carbon adsorber | unknown | Filter, wet scrubber, ZnO adsorber, removal of S and Cl |
| Gas* conditioning | WGS, CO$_2$-removal | WGS, CO$_2$-removal | WGS, CO$_2$-removal | unknown | unknown |
| Synthesis gas composition (% vol.) after gas cleaning | | | | | |
| H$_2$ | 40.2 (22.1) | 27 | 26.04 | 53 | 38-40 |
| CO | 39.2 (21.8) | 50 | 29.91 | 12 | 22-26 |
| CO$_2$ | 20.4 (11.4) | 14 | 33.69 | 25 | 20-22 |
| CH$_4$ | 0.1 (0) | <0.1 | 8.8 | 6 | 9-11 |
| N$_2$ | 0.1 (44.7) | 6.3 | 0.17 | 2 | 1.2-2 |

Note:
The number in the bracket for Carbo V gasifier is the synthesis gas composition, when air is used as gasification agent.
Sources:
(1) Henrich, E.and Dinjus, E. 2003 Das FZK-Konzept zur Kraftstoffherstellung aus Biomasse, Der Königsweg für eine effiziente Strom-und Kraftstoffbereitstellung, Leipzig;
(2) Rauch, R. 2002 Zweibett-Wirbelschichtvergasung in Guessing (A) mit 2 MW$_{el}$/4.5 MW$_{th}$; Konzept, Betrieberfahrung und Wirtschaftlichkeit. 7. Holzenergie-Symposium, Zürich.
*Optional unit, not required in this application.

As is known, the gasifier is useful for synthesizing a hydrogen lean or deficient synthesis gas (syngas) stream in a non-catalytic partial oxidation reaction. The so formed syngas is then subjected to cleaning operations 18 with subsequent removal of carbon dioxide at 20. It is not preferred in this process to include a water gas shift (WGS) reactor unit prior to the CO$_2$ removal as all the carbon, primarily as CO is used to the maximum production of synthesis liquids product. The process uses the supplemental addition of hydrogen to maximize the conversion to syndiesel. The raw syngas is treated in various steps of scrubbing units and guard units well known to those skilled in the art to create a relatively pure clean syngas suitable for use in a Fischer-Tropsch unit. The carbon dioxide removal may also include a compression step (not shown) which is optionally attributable to the other processes discussed in forthcoming Figures. The syngas is then transferred to a Fischer-Tropsch reactor 22 to produce the hydrocarbons and water. The so formed hydrocarbons are then passed on to a hydrocarbon cracking stage 24, a product fractionating stage 26 with naphtha being produced at 28 as a fraction, as well as diesel 30 as an additional product. The diesel 30 formulated in this process is commonly known as syndiesel. As an example, this process as is well known in the art, results in the formulation of 701 barrels per day (bbl/day) based on 20 tonnes per hour of forestry biomass. As is illustrated in the flow diagram, an external source of hydrogen 32 is to be supplemented to the Fischer-Tropsch unit 22 and hydrocarbon cracking unit 24 denoted as streams 36 and 34 respectively. Further, energy 35 from the gasifier, typically in the form of steam, may be used to generate power and this is equally true of the Fischer-Tropsch reactor 22 creating energy 40. Table 2 establishes a comparison between FT diesel and conventional petroleum based diesel.

TABLE 2

Specification of FT-diesel in comparison to conventional diesel

| Diesel Fuel Specification | FT-Diesel | Conventional Diesel |
|---|---|---|
| Chemical formula | Paraffin | C$_{12}$H$_{26}$ |
| Molecular weight (kg/kmol) |  | 170-200 |
| Cetane number | >74 | 50 |
| Density (kg/l) at 15° C. | 0.78 | 0.84 |
| Lower Heating Value (MJ/kg) at 15° C. | 44.0 | 42.7 |
| Lower Heating Value (MJ/l) at 15° C. | 34.3 | 35.7 |
| Stoichiometric air/fuel ratio (kg air/kg fuel) |  | 14.53 |
| Oxygen content (% wt) | ~0 | 0-0.6 |
| Kinematic viscosity (mm$^2$/s) at 20° C. | 3.57 | 4 |
| Flash point (° C.) | 72 | 77 |

Source: KMITL Sci. Tech. J. Vol. 6 No. 1 January-June. 2006, p. 43

TABLE 3

Typical Specification of FT-Jet Fuel

| Typical Product Specification | FT-Jet Fuel |
|---|---|
| Acidity mg KOH/g | 0.10 |
| Aromatics % vol max | <25.0 |
| Sulfur mass % | <0.40 |

TABLE 3-continued

Typical Specification of FT-Jet Fuel

| Typical Product Specification | FT-Jet Fuel |
|---|---|
| Distillation ° C. | |
| 50% recovered | Min 125° C. max 190° C. |
| End Point | 270° C. |
| Vapor Pressure kPa max | 21 |
| Flash Point ° C. | — |
| Density 15° C., kg/m3 | 750-801 |
| Freezing Point ° C. max | −51 |
| Net Heat Combustion MJ/kg min | 42.8 |
| Smoke Point mm, min | 20 |
| Naphthalenes vol % max | <3.0 |
| Copper Corrosion 2 hr @ 100° C., max rating | No 1 |
| Thermal Stability | |
| Filter Pressure drop mm Hg, max | 25 |
| Visual Tube rating, max | <3 |
| Static Test 4 hr @ 150° C. mg/100 ml, max | — |
| Existent Gum mg/100 ml, max | — |

Naphtha can be generally defined as a distilled fraction of the Fischer-Tropsch FT hydrocarbon liquids, categorized by way of example with a typical boiling range of 30° C. to 200° C., and more preferred 30° C. to 105° C. The specific naphtha specification will be optimized for each application to maximize syndiesel production and partially or fully eliminate the naphtha byproduct.

Suitable examples of FT reactors include fixed bed reactors and slurry-bubble reactors such as tubular reactors, and multiphase reactors with a stationary catalyst phase. For the slurry-bubble reactor, the FT catalyst particles are suspended in a liquid, e.g., molten hydrocarbon wax, by the motion of bubbles of syngas sparged into the bottom of the reactor. As gas bubbles rise through the reactor, the syngas is absorbed into the liquid and diffuses to the catalyst for conversion to hydrocarbons. Gaseous products and unconverted syngas enter the gas bubbles and are collected at the top of the reactor. Liquid products are recovered from the suspending liquid using different techniques such as separators, filtration, settling, hydrocyclones, and magnetic techniques. Cooling coils immersed in the slurry remove heat generated by the reaction. In a fixed bed reactor, the FT catalyst is held in a fixed bed contained in tubes or vessels within the reactor vessel. The syngas flowing through the reactor vessel contacts the FT catalyst contained in the fixed bed. The reaction heat is removed by passing a cooling medium around the tubes or vessels that contain the fixed bed. Other possibilities for the reactor will be appreciated by those skilled.

In the FT process, $H_2$ and CO combine via polymerization to form hydrocarbon compounds having varying numbers of carbon atoms. Typically 70% conversion of syngas to FT liquids takes place in a single pass of the FT unit. It is also common practice to arrange the FT reactors in series and parallel to achieve conversion levels of 90+%. After the FT separation stage to divert the unconverted syngas and light hydrocarbons, the FT liquids are directed to the hydrocarbon upgrader unit denoted as 27. The upgrader unit typically contains a hydrocracking step 24 and a fractionation step 26.

Hydrocracking denoted as 24 used herein is referencing the splitting an organic molecule and adding hydrogen to the resulting molecular fragments to form multiple smaller hydrocarbons (e.g., $C_{10}H_{22}+H_2 \rightarrow C_4H_{10}$ and skeletal isomers+$C_6H_{14}$). Since a hydrocracking catalyst may be active in hydroisomerization, skeletal isomerization can occur during the hydrocracking step. Accordingly, isomers of the smaller hydrocarbons may be formed. Hydrocracking a hydrocarbon stream derived from Fischer-Tropsch synthesis preferably takes place over a hydrocracking catalyst comprising a noble metal or at least one base metal, such as platinum, cobalt-molybdenum, cobalt-tungsten, nickel-molybdenum, or nickel-tungsten, at a temperature of from about 550° F. to about 750° F. (from about 288° C. to about 400° C.) and at a hydrogen partial pressure of about 500 psia to about 1,500 psia (about 3,400 kPa to about 10,400 kPa).

The hydrocarbons recovered from the hydrocracker are further fractionated 26 and refined to contain materials that can be used as components of mixtures known in the art such as naphtha, diesel, kerosene, jet fuel, lube oil, and wax. The combined unit consisting of the hydrocracker 24 and hydrocarbon fractionator 26 are commonly known as the hydrocarbon upgrader 27. As is known by those skilled in the art, several hydrocarbon treatment methods can form part of the upgrader unit depending on the desired refined products. The hydrocarbon products are essentially free of sulfur. The diesel may be used to produce environmentally friendly, sulfur-free fuel and/or blending stock for diesel fuels by using as is or blending with higher sulfur fuels created from petroleum sources.

Further, useable energy commonly generated as steam from the gasification stage, denoted by numeral 35, may be used to generate electric power 38. This is equally true of useable energy that can be drawn from the Fischer-Tropsch unit, owing to the fact that the reaction is very exothermic and this represents a useable source of energy. This is denoted by numeral 40.

Figure 2:
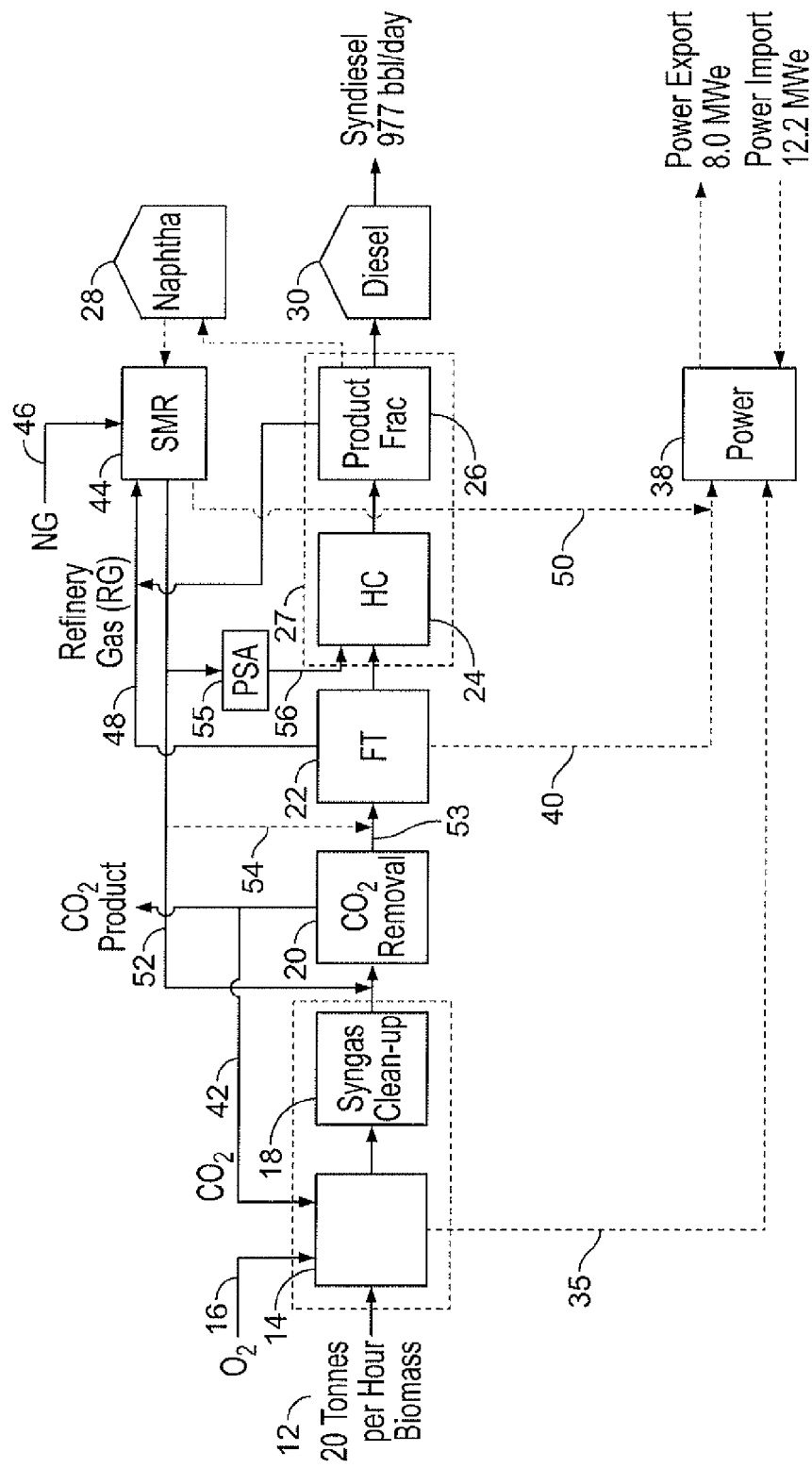
FIG. 2 is a process flow diagram similar to FIG. 1, illustrating a first embodiment of the present invention.

Turning now to FIG. 2, shown is a preliminary embodiment of the technology of the instant invention. As is evinced from FIG. 2, many of the preliminary steps are common with that which is shown in FIG. 1. Table 4 lists a series of biomass species with calorific values for the purposes of examples. Table 5 sets forth component analysis of examples of biomass.

TABLE 4

Proximate analysis and calorific values of different biomass resources

| Biomass Species | Calorific value (Kcal/Kg) | Ash content (%) | Volatile matter (%) | Fixed Carbon (%) |
|---|---|---|---|---|
| Bagass | 3406-4403.6 | 1.8-22.1 | 18.2-86.3 | 7.0-70.8 |
| Bamboo Dust | 3632-4731 | 5.8-16.5 | 71.6-76.5 | 9.3-21.0 |
| Coconut coir | 4318 | 17.2 | 69.6 | 13.2 |
| Coconut fibre waste | 4332 | 4.7 | 82.1 | 13.2 |
| Coconut shell | 3649 | 1.9 | 79.9 | 18.2 |
| Coir pith | 4146 | 9.1 | 62.4 | 28.5 |
| Corn cob | — | 85.4 | 2.8 | — |
| Corn stalks | — | 8.1 | 6.8 | — |
| Cotton gin waste | — | 88.0 | 5.4 | — |
| Cotton shell | 4360 | 4.6 | 72.2 | 23.3 |
| Groundnut shell | 4200-4680 | 2.3-5.4 | 72.2-77.9 | 19.8-22.9 |
| Mustard shell | 4126-4320 | 3.7-9.4 | 72.5-79.7 | 13.9-18.1 |
| Mustard stalk | 4018-4473 | 2.6-17.2 | 60.9-80.0 | 14.3-21.9 |
| Pine needles | 4750 | 1.5 | 72.4 | 26.1 |
| Rice Bran | 3950 | 13.1 | 75.7 | 11.2 |
| Rice Husk | 3000-3618 | 13.9-22.4 | 62.1-68.9 | 12.7-41.2 |
| Rice straw (ground) | 3730 | 15.5 | 68.3 | 16.2 |
| Sugarcane leaves | 4120-4390 | 4.8-10.9 | 70.4-77.4 | 14.9-19.2 |
| Sweet Sorghum stalk | 4124-4230 | 7.4-7.7 | 74.0-76.0 | 16.6-18.3 |

TABLE 4-continued

Proximate analysis and calorific values of different biomass resources

| Biomass Species | Calorific value (Kcal/Kg) | Ash content (%) | Volatile matter (%) | Fixed Carbon (%) |
|---|---|---|---|---|
| Wheat stalk | 3912 | 5.7 | 78.7 | 15.6 |
| Wheat straw | 4100-4516 | 6.4-8.0 | 69.6-80.6 | 11.7-24.0 |
| Municipal solid waste | 1345-3376 | 27.5-70.0 | 25.0-55.1 | 4.0-17.4 |
| Forestry waste | 4000-4500 | 0.25-3 | 2-5 | 66-69 |

Source: Biomass-Thermo-chemical Characterization, Ed. PVR Iyer, TR Rao & PD Grover, Biomass Conversion Laboratory, Chemical Engineering Department, IIT Delhi

TABLE 5

Sample component analysis of biomass (wt % on dry basis)

| Biomass Species | Cellulose | Hemi-cellulose | Lignin | Extractives | Ash |
|---|---|---|---|---|---|
| Bagasse | 33.6-41.3 | 22.6-27.0 | 15.0-18.3 | 13.7-18.4 | 2.9 |
| Coconut coir | 47.7 | 25.9 | 17.8 | 6.8 | 0.8 |
| Coconut shell | 36.3 | 25.1 | 28.7 | 8.3 | 0.7 |
| Coir pith | 28.6 | 15.3 | 31.2 | 15.8 | 7.1 |
| Corn cob | 40.3 | 28.7 | 16.6 | 15.4 | 2.8 |
| Corn stalks | 42.7 | 23.6 | 17.5 | 9.8 | 6.8 |
| Cotton gin waste | 77.8 | 16.0 | 0.0 | 1.1 | 5.4 |
| Rice husk | 31.3 | 24.3 | 14.3 | 8.4 | 23.5 |
| Rice straw | 30.2-41.36 | 24.5-22.7 | 11.9-13.6 | 5.6-13.1 | 16.1-19.8 |
| Wheat straw | 30.5-40.0 | 28.9 | 16.4 | 7.38-13.4 | 7.0-11.2 |

Source: Biomass-Thermo-chemical Characterization, Ed. PVR Iyer, TR Rao & PD Grover, Biomass Conversion Laboratory, Chemical Engineering Department, IIT Delhi Conveniently, the initial feedstock to the gasifier may be any one of coal, biomass, petroleum resids, municipal waste, plastics, wood, demetallized tire scrap, forestry waste, waste water byproduct, sewage biomass, livestock waste products, agricultural byproduct and waste, carbonaceous material and mixtures thereof.

As is widely appreciated by those of skill, the hydrogen to carbon monoxide ratio of the clean syngas leaving the biomass gasifier stage once it has passed the cleanup stage 18, is generally 1:1. In the embodiment shown in FIG. 2, the carbon dioxide removal stage 20, at least a portion of the carbon dioxide 42 may be reintroduced into the gasifier 14 for purposes of controlling the reaction therein. Once the $CO_2$ is removed, the procedure follows the unit operations as identified in FIG. 1.

As the key difference, one of the most effective procedures in the instant technology, relates to the fact that once the product fractionation stage has been completed and the naphtha 28 formulated, it has been found that by inclusion of the hydrogen generator using naphtha as the primary source, significant results can be achieved in the production of the synthetic diesel. This is effected by transferring at least a portion of the naphtha fraction created to a hydrogen steam generator 44, shown in the example as a steam methane reformer (SMR). This results in the formation of the hydrogen rich stream 52. This procedure is well known and is perhaps one of the most common and economic methods for synthesizing hydrogen. The general reaction is as follows:

Natural Gas+Naphtha+Steam+Heat→$CO+nH_2+CO_2$

The steam reformer may contain any suitable catalyst and be operated at any suitable conditions to promote the conversion of the naphtha hydrocarbon to hydrogen $H_2$ and carbon monoxide. The addition of steam and natural gas may be optimized to suit the desired production of hydrogen and carbon monoxide. Generally natural gas or any other suitable fuel can be used to provide energy to the SMR reaction furnace. The catalyst employed for the steam reforming process may include one or more catalytically active components such as palladium, platinum, rhodium, iridium, osmium, ruthenium, nickel, chromium, cobalt, cerium, lanthanum, or mixtures thereof. The catalytically active component may be supported on a ceramic pellet or a refractory metal oxide. Other forms will be readily apparent to those skilled.

As has been discussed herein previously, it is unusual and most certainly counter-intuitive to effectively destroy the naphtha in order to generate a hydrogen rich stream as the naphtha is commonly desired as primary feedstock for gasoline production. Although this is the case, it is particularly advantageous in the process as set forth in FIG. 2. The steam methane reformer may be augmented in terms of the hydrogen using natural gas 46, or using refinery gas 48 from the Fischer-Tropsch reactor 22 and the hydrocarbon upgrader 27. Energy recovered from the SMR 44 in the form of steam may be distributed via line 50 for production of electric power 38.

Once the hydrogen rich stream 52 has been formulated in the SMR, the same is introduced into the syngas stream exiting syngas clean-up stage 18. At this point, a hydrogen rich stream from the SMR unit is combined at an optimal rate with a relatively lean hydrogen gas stream to generate the optimal Fischer-Tropsch syngas feed. This commingled or mixed stream is subject to the carbon dioxide removal and acts as a feedstock to the Fischer-Tropsch reactor 22. At the point of entering the Fischer-Tropsch reactor 22, the stream has a hydrogen to carbon monoxide ratio of approximately 1:1 to 5:1, preferably 2:1 as indicated by numeral 53. Optionally, a portion 54 of the hydrogen rich stream 52 may bypass the $CO_2$ removal unit and feed the Fischer-Tropsch unit directly at 53. Once the carbon dioxide removal stage 20 has been effected, the hydrogen to carbon monoxide ratio is approximately 2 and is then subsequently introduced into the Fischer-Tropsch reactor 22 and subjected to the same steps that have been discussed with respect to FIG. 1. The results are quite substantial, providing the naphtha recirculation route and particularly using the naphtha as a feedstock to generate a hydrogen rich stream, the result is syndiesel production in great excess to that which is discussed in FIG. 1. As an example, the syndiesel production by following the methodology of FIG. 2 results in a 977 barrel per day (bbl/day) production based on a 20 tonnes per hour biomass feed.

Subsequently, a small portion of the hydrogen rich stream 52 may be removed and treated on by a common hydrogen purification unit, a typical example is a Pressure Swing Adsorption unit (PSA) 55, to create a high quality hydrogen stream 56 for use in the hydrocarbon upgrader unit 27.

Figure 3:
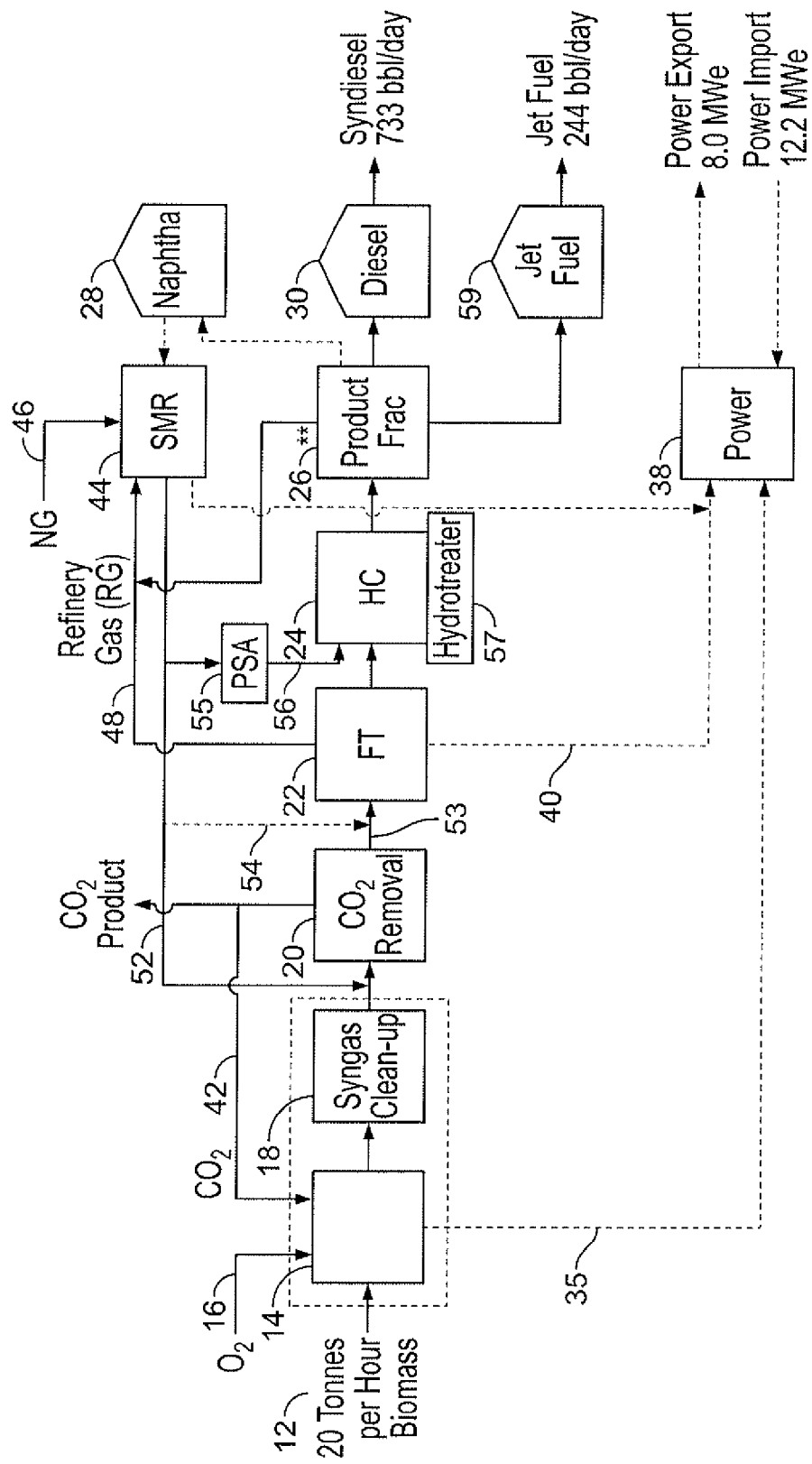
FIG. 3 is a process flow diagram illustrating a further variation of the instant technology.

FIG. 3 sets forth a further interesting variation on the overall process that is set forth in FIG. 2. In this variation, the process results in the formulation of not only diesel, but also jet fuel or aviation fuel. The operations common with FIG. 2 are denoted with similar numerals. In this process variation, a split product is made between the jet fuel and diesel fuel. As an example, the split may be 25%:75% between jet fuel and diesel production from the fractionator 26. In order to effect this, jet fuel as indicated by numeral 59 in FIG. 3, requires modification of the fractionation unit operation 26. As will be appreciated by those skilled in the art, the fractionation unit operation can be modified for the jet fuel recovery by adding a suitable side stripper as part of the fractionation unit operation 26. In terms of further modifications to the overall process set forth in FIG. 2, a hydrotreater step 57 should be considered for the hydrocarbon cracking unit. The hydrotreater is a method to ensure the stability of the refined products by addition and saturation of the product with hydrogen. The jet fuel produced is unique in that it will be of very high purity and free of sulfur compounds, thus coveted as a "Clean Green" aviation fuel.

Figure 4:
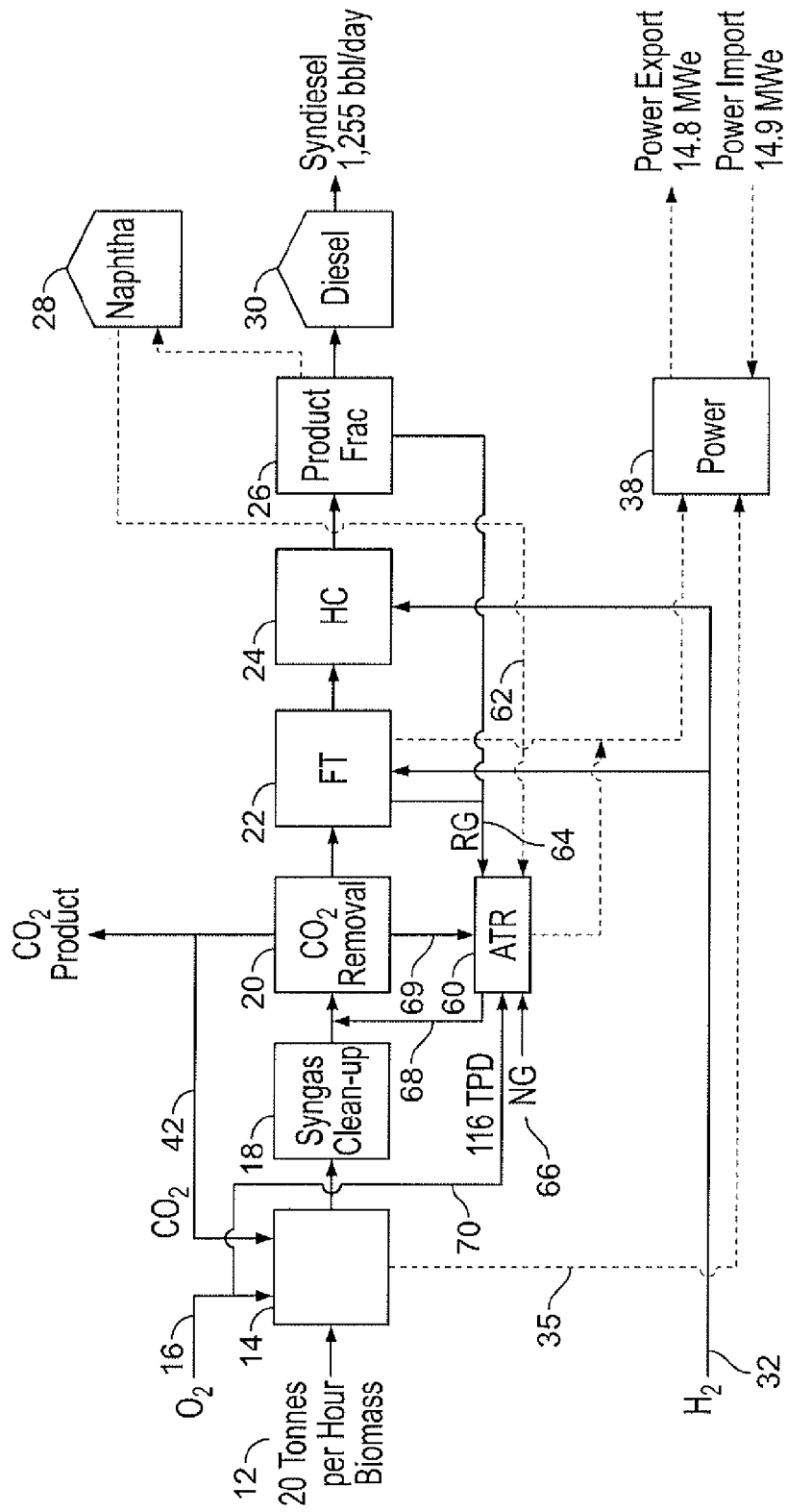
FIG. 4 is a process flow diagram illustrating yet another variation of the present invention.

A further variation of the overall process embraced by the technology discussed herein is shown in FIG. 4. In essence, the process flow of unit operations shown in FIG. 4 is an amplification of the process as shown in FIG. 2 and essentially augments further utilization of carbon and hydrogen to provide an alternate stream for introduction into the Fischer-Tropsch reactor 22. This has dramatic consequences on the production of syndiesel. As with the previous figures, the similarly denoted unit operations are common in FIG. 4. From the flow diagram, it is evident that the SMR unit operation 44 FIG. 2 is absent in this flow diagram. This unit operation has been replaced with an ATR (Autothermal Reformer) unit operation, denoted by numeral 60. Both the naphtha and the refinery gas, 62 and 64, respectively, may be combined or separately transformed in the ATR unit 60. Utility heating for the ATR may be provided by natural gas 66. Oxygen may be introduced at 70. The ATR is useful to produce some hydrogen and carbon monoxide syngas which is, of course, useful to introduce into and further enhance the Fischer-Tropsch reactor 22. External hydrogen may be used for the hydrocarbon upgrader 27 requirement. The formed syngas from the ATR is denoted by line 68 and is introduced in advance of the carbon dioxide removal stage 20. Alternatively, a portion of 68 or the entire stream 68 may be introduced after the $CO_2$ removal unit 20. Additional carbon dioxide 69 may also be provided to the ATR to optimize the augmented syngas composition to the Fischer-Tropsch unit 22.

Figure 5:
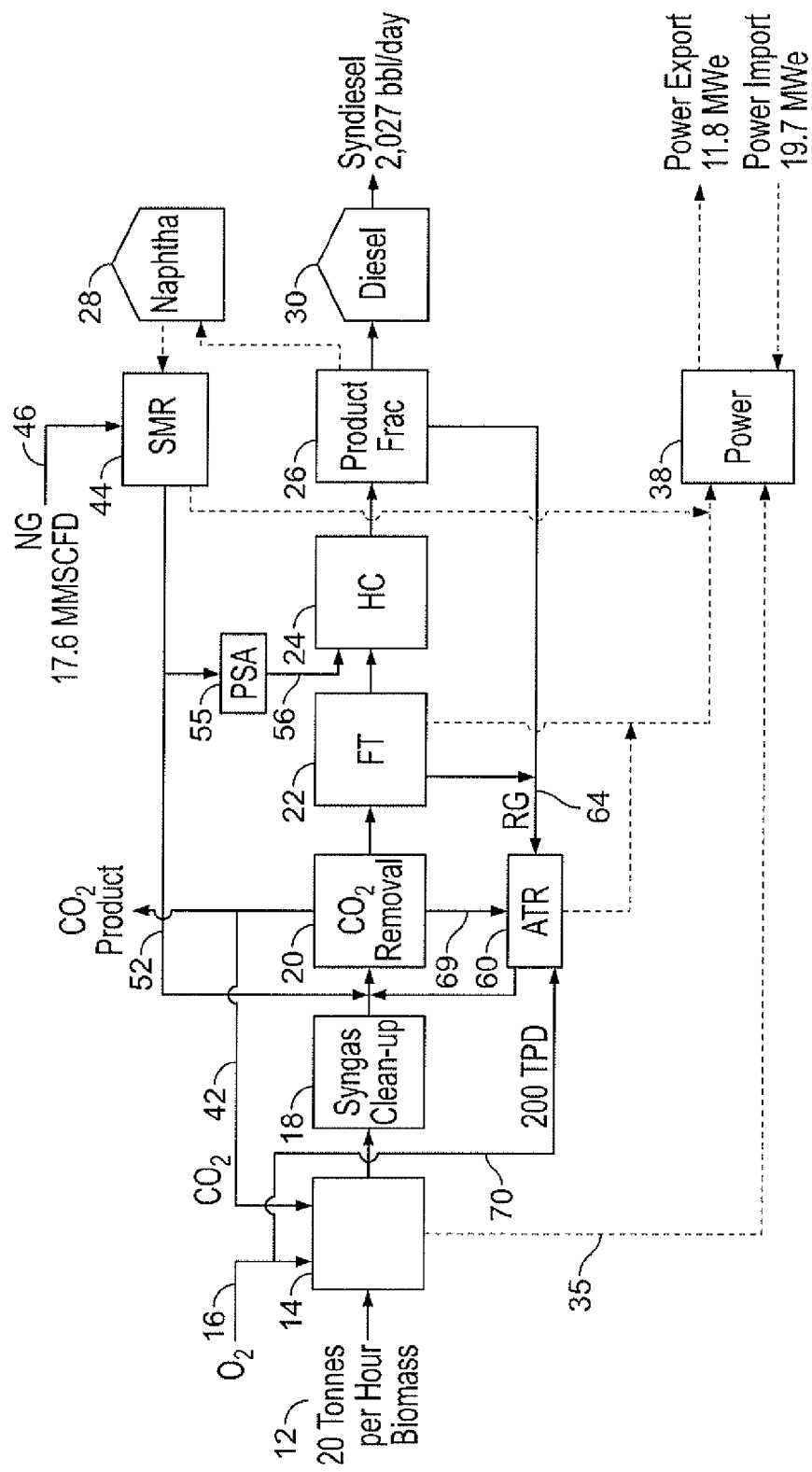
FIG. 5 is a process flow diagram of a still further embodiment of the present invention.

Turning to FIG. 5, what is shown is yet another variation of the overall process according to the present invention combining the benefits of FIGS. 2 and 4. In this embodiment, both the SMR and ATR unit operations are amalgamated into the generic circuit with one embodiment of the present invention to convert all the carbon introduced as biomass feed to high value syndiesel product. This has dramatic consequences in terms of productivity of the diesel as is clear from an output of, as an example, 2,027 barrels per day (bbl/day) based on 20 tonnes per hour of biomass feed. In this embodiment, the refinery gas 64 from the FT unit 22 and the upgrader unit 27 is employed as feedstock to the ATR unit 60. Further, naphtha is employed as feedstock to the SMR unit 44 to generate a hydrogen rich syngas. Further, the refinery gas 64, oxygen 70, natural gas 66 and carbon dioxide 69 are commingled in optimized proportions and processed through the ATR 60 and blended with the SMR 44 hydrogen rich syngas to achieve the optimum syngas for combining with stream 53 to the FT unit 22. This effectively results in a net increase in carbon monoxide as well as hydrogen for use in the Fischer-Tropsch reactor 22. As is evident from the flow diagram, the Fischer-Tropsch reactor is effectively fed with the hydrogen rich stream generated from the SMR as well as the supplemental syngas stream generated from the ATR. The SMR stream and ATR stream are commingled with the hydrogen lean syngas stream exiting cleanup unit operation 18 and subsequently introduced into the Fischer-Tropsch reactor 22. As noted above, this has a very significant effect on the output of the syndiesel and takes advantage of the effectiveness of the naphtha recycle for generating the hydrogen rich stream as well as the ATR which contributes hydrogen and carbon monoxide for mixture with the lean gas stream. The combination of all these syngas streams can effectively result in the full transformation of all the carbon entering the process as biomass being converted to highly valuable green syndiesel without by product hydrocarbons.

Figure 6:
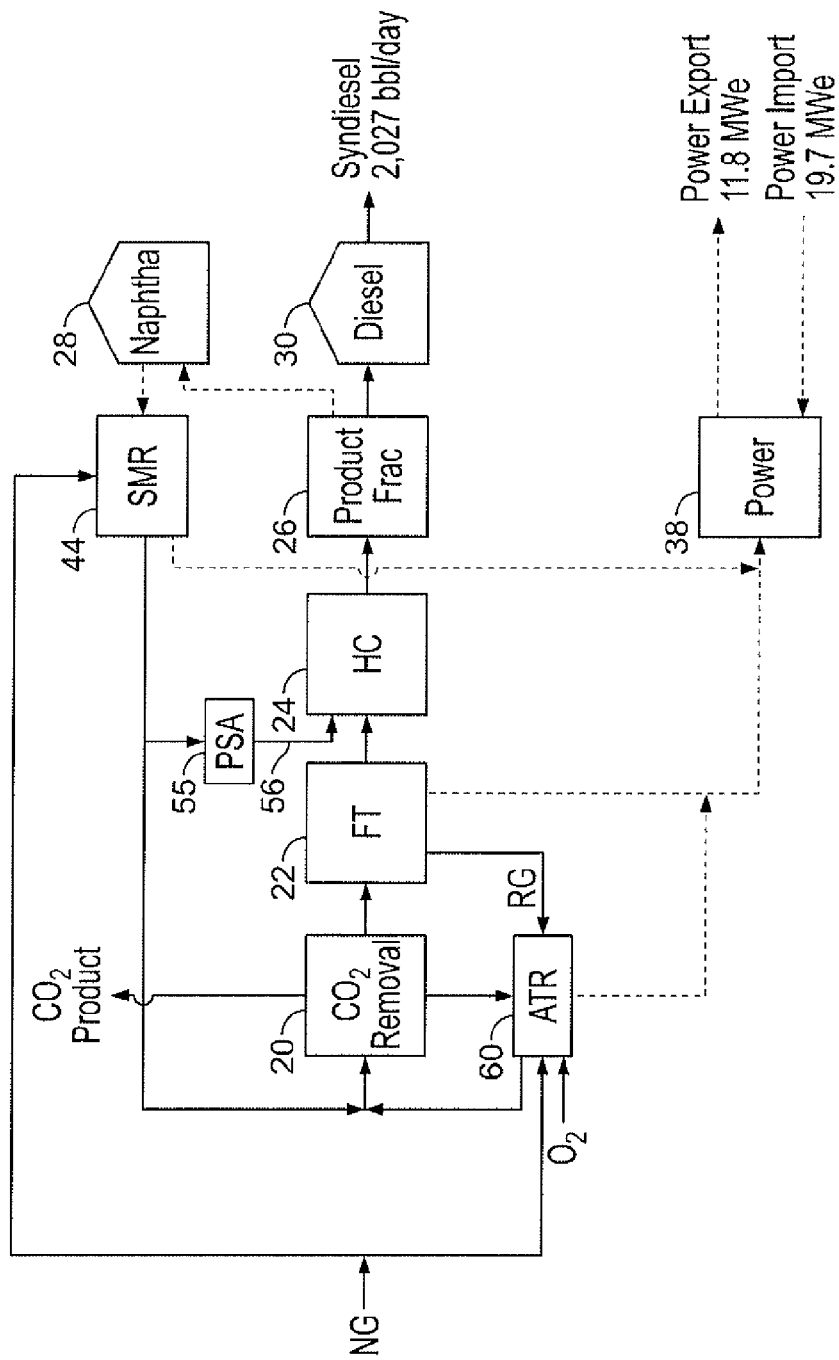
FIG. 6 is a process flow diagram illustrating a still further variation of the present methodology.

Referring now to FIG. 6, shown is a further variation of the overall process which is similar to that which is shown in FIG. 5, with the exception of the absence of gasifier 14 and syngas cleanup operation 18.

While the preferred embodiments of the invention have been shown and described, modifications thereof can be made by one skilled in the art without departing from the spirit and teachings of the invention. Reactor design criteria, hydrocarbon processing equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Background of the Invention is not an admission that it is prior art to the present invention, especially any reference that may have a publication date after the priority date of this application. The disclosures of all patents, patent applications and publications cited herein are hereby incorporated herein by reference, to the extent that they provide exemplary, procedural or other details supplementary to those set forth herein.

We claim:

1. A system for synthesizing hydrocarbons, said system comprising:
   (a) means for generating syngas lean in hydrogen content;
   (b) means for catalytically converting said syngas to produce hydrocarbons, containing at least naphtha;
   (c) a hydrogen generator;
   (d) circuit means for recycling naphtha to said hydrogen generator to form a hydrogen rich stream; and
   (e) circuit means for combining said hydrogen rich stream with said hydrogen lean stream to provide a blended and enriched hydrogen content stream for enhancing hydrocarbon production.

2. The system as set forth in claim 1, wherein said means for generating syngas comprises a thermal gasifier.

3. The system as set forth in claim 1, wherein said means for catalytically converting said syngas comprises a Fischer-Tropsch reaction.

4. The system as set forth in claim 1, wherein said circuit means for recycling naphtha to said hydrogen generator comprises a recycle loop.

5. The system as set forth in claim 1, wherein said hydrogen generator comprises a member selected from the group consisting of a steam methane reformer and a autothermal reformer or a combination thereof.

6. The system as set forth in claim 1, wherein said circuit means for recycling naphtha to said hydrogen generator comprises a recycle loop for recycling naphtha into at least one of said SMR, said ATR, or a combination thereof.

7. The system as set forth in claim 1, wherein said hydrogen generator comprises an SMR and an ATR.

8. The system as set forth in claim 1, further including means for hydrocracking product exiting said means for catalytically converting said syngas.

9. The system as set forth in claim 1, further including means for fractionating hydrocracked product.

10. The system as set forth in claim 1, further including means for withdrawing energy from said system to act as a precursor for power generation.

11. The system as set forth in claim 1, further including means for storing formulated enhanced hydrocarbon.

* * * * *